Dec. 2, 1958 A. C. STOVER 2,862,724
BY-PASS ARRANGEMENT FOR VEHICLE SUSPENSION
Filed May 23, 1955 2 Sheets-Sheet 1
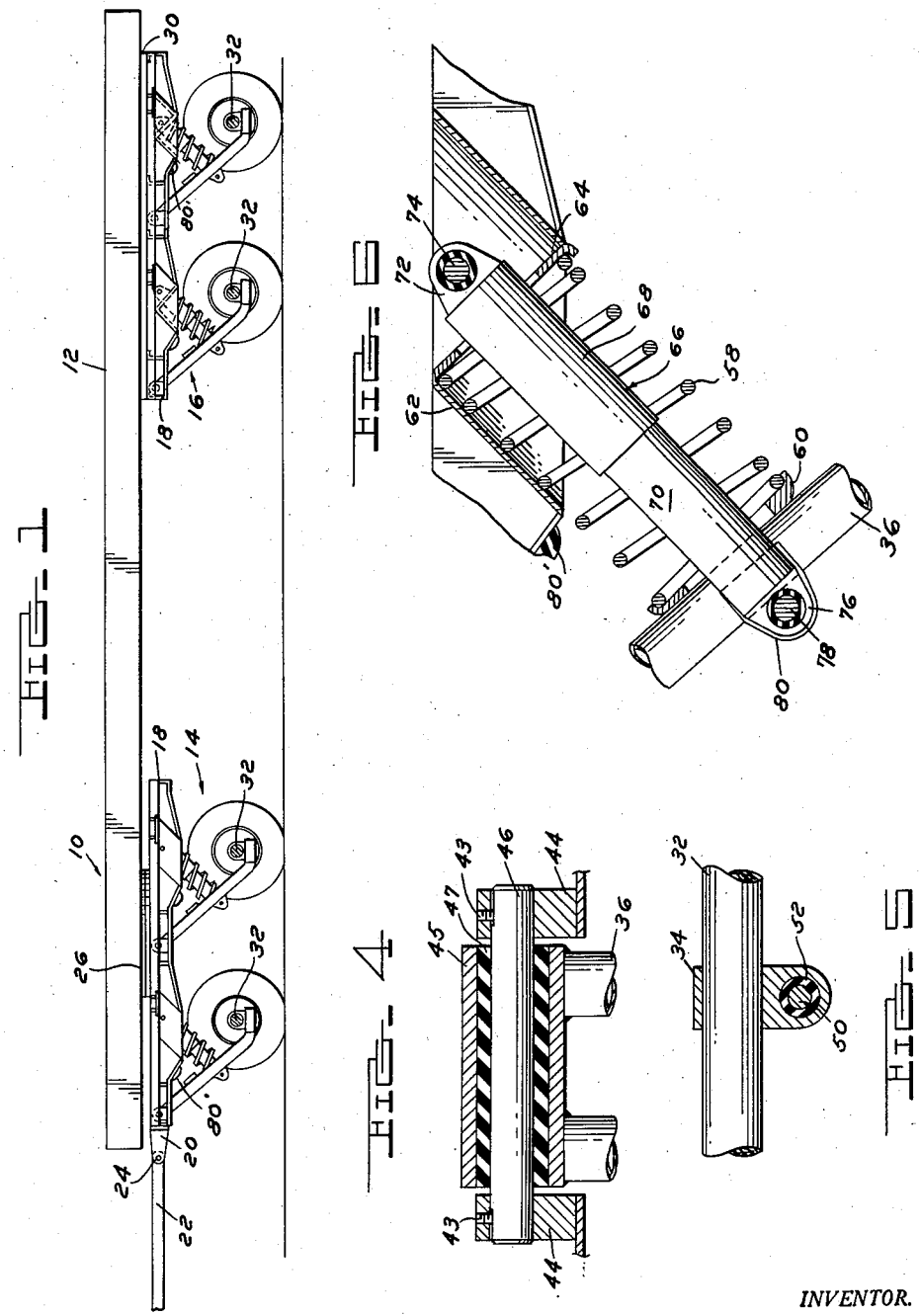
INVENTOR.
ANCIL C. STOVER
BY
ATTORNEYS Dec. 2, 1958 A. C. STOVER 2,862,724
BY-PASS ARRANGEMENT FOR VEHICLE SUSPENSION
Filed May 23, 1955 2 Sheets-Sheet 2
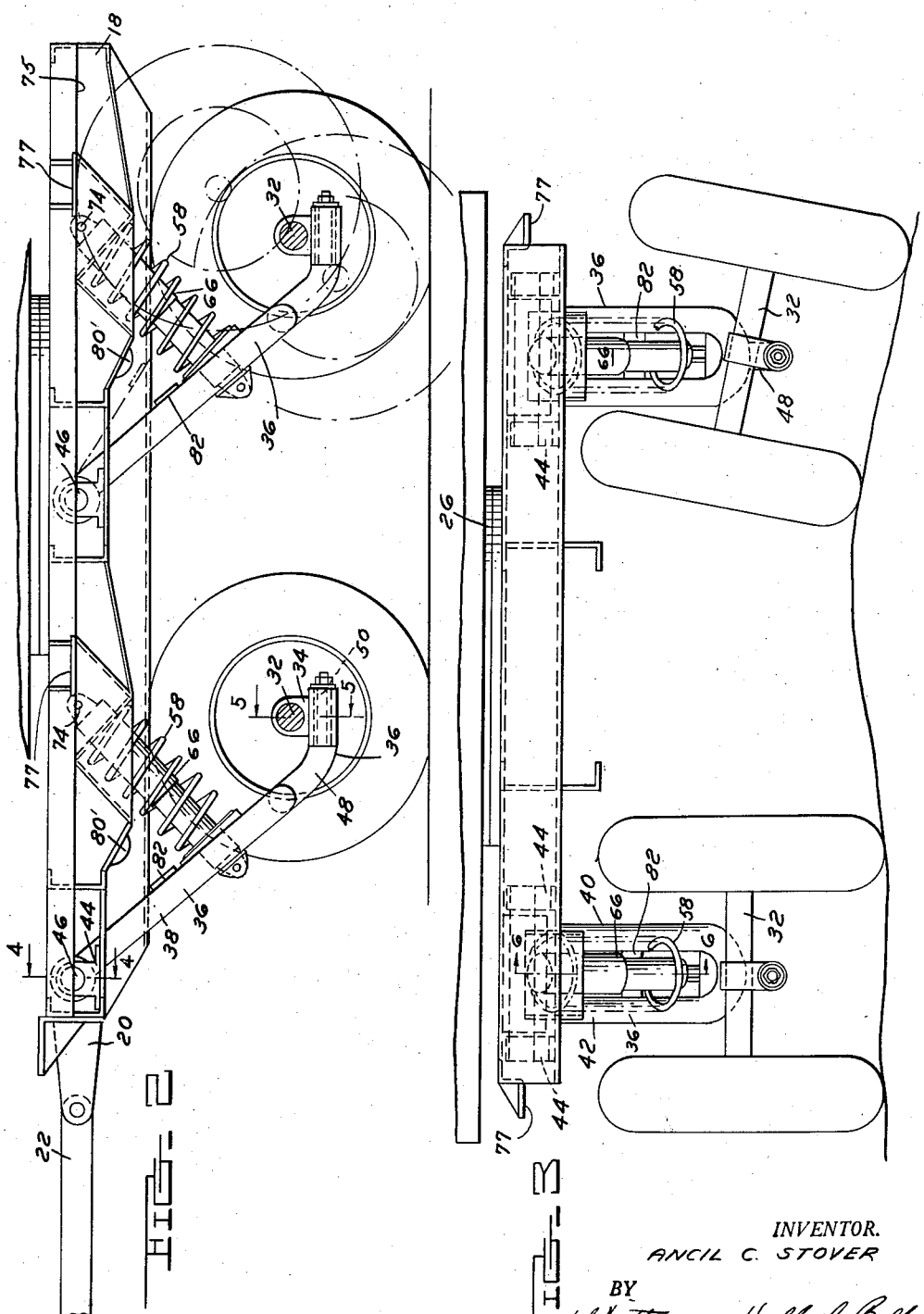
INVENTOR.
ANCIL C. STOVER
BY
ATTORNEYS United States Patent Office 2,862,724
Patented Dec. 2, 1958

2,862,724

BY-PASS ARRANGEMENT FOR VEHICLE SUSPENSION

Ancil C. Stover, Louisville, Ky., assignor to The Eisenhauer Manufacturing Company, Van Wert, Ohio, a partnership Application May 23, 1955, Serial No. 510,162

2 Claims. (Cl. 280—124)

This invention relates to a vehicle suspension system.

One object of this invention is to provide a suspension system for a vehicle which is rugged, stable, simple, soft riding and easy to maintain.

Another object of the invention is to provide a suspension designed to divert impact forces and thereby in effect decrease the sharpness or pitch of a bump or rise in the path of the ground engaging wheels.

Still another object of the invention is to provide a suspension which will return to normal, that is, get back under the load after passing over a bump in less time than a conventional suspension.

A further object of the invention is to provide a suspension in which an increasing portion of this load will bypass the suspension and be transmitted directly to the sprung assembly when the magnitude of the shock load is increased to a predetermined amount.

Other objects of the invention will become apparent as the following description proceeds, especially when taken in conjunction with the accompanying drawings wherein:

Figure 1 is a side elevational view of a trailer having a suspension system embodying the features of the present invention.

Figure 2 is an enlarged side elevational view of the front bogie and portions of the adjacent mechanism.

Figure 3 is a rear elevational view of the structure shown in Figure 2 and showing one of the axles passing over uneven terrain.

Figure 4 is a sectional view taken along the line 4—4 on Figure 2.

Figure 5 is a sectional view taken along the line 5—5 on Figure 2.

Figure 6 is a sectional view taken along the line 6—6 on Figure 3.

In a vehicle of the type specifically described below, the mean vertical height of the suspended load and body above the supporting road surface should be as nearly constant as possible. However, the individual wheels in following the contour of the road surface will oscillate vertically in relation to the suspended load and body. The relative movement between the unsprung mass and the body may be divided into two parts. The first part or phase may be taken as the period of during during which the unsprung mass is surmounting a sudden increase in elevation of the road surface. During this first phase, the unsprung mass will rise vertically in relation to the body. This first phase will end when suspension spring rate equals the rate at which energy derived from impact is being transmitted to the load plus static load. The second period of the cycle might be termed the reaction phase. During the reaction phase, all relative movements of the suspension are reversed since the spring rate now exceeds the static load plus the energy stored in the unsprung mass, and the energy thus stored will be released from the suspension springs until these opposing forces are again in balance ending the reaction phase and completing the cycle. During this phase the unsprung mass will descend vertically from the suspended body.

The amount of kinetic energy stored by impact in the unsprung mass during the first phase will vary as the square of the velocity (speed of vehicle), the angle of impact or pitch of rise, and the range of vertical movement or height of rise. The suspension system will convert a part of the impact force to kinetic energy stored in the unsprung mass, and released gradually to the body during the first phase of the cycle through the medium of the suspension springs. The rate at which the energy is released will be governed by the spring rate and shock absorber rate, if any, plus friction. The remainder of impact force will be stored in the suspension springs to be released during the reaction phase.

In the final analysis, the impact force must be transmitted to the suspended load or body, and the efficiency of any suspension system may be measured by the uniformity of rate at which this force is delivered to the suspended load throughout the suspension cycle. The rate of delivery of this force to the load will reach a peak at the end of the first phase, and the flattening of this peak is the purpose of suspension springing.

A reduction of the kinetic energy factor and an acceleration of the reaction phase offers the most practical and efficient means of spreading the release of energy derived from impact over the greatest possible portion of the suspension cycle without sacrifice of stability. The conventional approach to this problem is to keep the weight of the unsprung mass as low as practical, and to provide soft springing of increased range. The latter entails a relative loss of stability which might become serious in some applications.

A shortening or reducing of the time element during the reaction phase is desirable to attain a more uniform release of energy because the forces dealt with during this period are much less than those involved in the first phase.

The principle which is peculiar to the suspension about to be described is the angle of the pivoted suspension arm which momentarily reduces the forward velocity of the unsprung mass during the initial phase of the suspension cycle, thereby increasing the time needed to surmount a given rise, and resulting in a slower rate of impact to the suspension and consequently a reduction in kinetic energy stored in the unsprung mass. During the second or reaction phase, the wheels will move forward in relation to the suspended load, thus momentarily increasing their forward velocity, thereby reducing the time needed to "uncock" the suspension, or to release the energy stored in the springs.

Referring now more particularly to the drawings and especially to Figure 1, a trailer is generally indicated at 10 having a platform 12 supported by the front and rear bogies 14 and 16 respectively. The frame 18 of the front bogie has an attaching bracket 20 secured along the front edge thereof and a draw bar 22 has the rear end portion pivoted to the bracket 20 for vertical swinging about the axis of pivot pin 24. The front bogie 14 is attached to the platform by a fifth wheel 26.

The bogie 16 is extactly like the bogie 14 except that it is, of course, not provided with a draw bar or the associated attaching bracket as in the case of the front bogie. The rear bogie is not attached directly to the platform 12 of the trailer but rather its frame 18 is attached to the underside of a spacer 30 which, in turn, is secured to the underside of the platform. This is done in order to support the platform in a level condition due to the fact that the front bogie likewise does not directly support the platform but rather is secured to the fifth wheel 26.

The front bogie 14 is provided with two laterally spaced front axle assemblies and two laterally spaced rear axle assemblies. The axle of each assembly is identified by the numeral 32 and extends transversely of the vehicle with the two front axles in alignment and the two rear axles in alignment. The two front axles are spaced a substantial distance ahead of the two rear axles and the front and rear axles are respectively arranged in tandem relationship.

Each axle 32 of the front bogie extends through and is secured to a member 34 which has a tubular lower portion or sleeve 36, the axis of which extends horizontally beneath and at right angles to the axle opening in the member, that is, in a fore and aft direction with respect to the bogie.

A suspension arm 36 is associated with each axle and is provided for connecting each axle to the frame 18 of the front bogie. The arms 36 are preferably of tubular steel construction for lightness and strength and include the generally U-shaped portion 38 having the arms 40 and 42 respectively pivotally connected to the frame 18. As seen particularly in Figures 2, 3 and 4, a pair of laterally spaced mounting brackets 44 are provided for each suspension arm 36, these brackets 44 having a pin 46 extending therebetween and upon which the upper ends of the arms 40 and 42 of each suspension arm 36 are supported. The pins 46 extend in a direction parallel to the axles 32 and support the suspension arms for swinging movement in a vertical plane.

As shown in Figure 4, each pivot pin 46 is fixedly secured to the brackets 44 by set screws 43 to prevent rotation of the pin relative to the supporting brackets. The upper ends of the arms 40 and 42 are welded to a sleeve 45 on the pin and a tubular rubber bushing 47 fills the space between the sleeve 45 and the pin 46 having its outer surface fixed to the inner surface of sleeve 45 and having its inner surface fixed to the surface of the pin. This rubber bushing thus tends to restore the suspension arm of each axle assembly to approximately the position shown in the drawings following deflection.

As will be seen in the drawings, these suspension arms extend downwardly and rearwardly from the pivoted upper end portions, and extending downwardly and rearwardly from the junction between the arms 40 and 42 of the U-shaped portion 38 of each suspension arm is the extension 48 having the horizontally extending reduced end portion 50 disposed within the sleeve 36 of the mounting member 34.

Referring now to Figure 5 it will be seen that a rubber bushing 52 is disposed in the space between the reduced portion 50 and the sleeve 36 of each axle assembly, and this bushing 52 has the outer surface fixed to the bore of the sleeve 36 and the inner surface fixed to the reduced portion 50. The result is that the axle supporting member 34 and the axle supported thereby may have a limited degree of rotation about the axis of the reduced portion 50 of the suspension arm but the tubular bushing 52 at all times tends to restore the axle to the position shown at the left hand side of Figure 3.

Coil springs 58 are provided for each axle assembly. As illustrated particularly in Figures 2 and 6, the coil spring 58 extends approximately at right angles to the suspension arm, having the lower end supported upon an annular plate 60 suitably secured to the arms 40 and 42 of the suspension arm and having a slightly cupped shape to retain the spring against transverse shifting. The upper end of each spring 58 extends into a well 62 formed in the frame of the bogie, the upper or end wall of the well indicated at 64 providing an abutment for the upper end of the coil spring. The coil springs 58 are sufficiently strong to support the sprung assembly by preventing the suspension arms 36 from turning about their pivoted upper ends in an upward direction towards the sprung assembly.

It will also be noted particularly in Figures 2, 3, and 6 that double acting strut type rubber mounted shock absorbers 66 are respectively associated with the axle assemblies. Each shock absorber is in the form of a two-part unit having the cylinder part 68 and the piston part 70 telescoped within the cylinder part. Each shock absorber extends within the coil spring of the associated axle assembly, the upper end of the cylinder part 68 having an ear 72 pivoted to the frame 18 by a pivot pin 74 extending parallel to the axis of the pivot pin 46. The lower end of the piston part 70 has an ear 76 pivoted to a pin 78 which extends parallel to the pin 74 and has the opposite ends secured to the brackets 80 respectively secured to the arms 40 and 42 of the suspension arm. Rubber bushings are provided about the pivot pins 74 and 78. The shock absorbers may be of any suitable construction and are employed to damp out the movement of the suspension arms. They may be hydraulic having restricted orifices through which the hydraulic fluid must pass, for example. The shock absorbers also have provision for determining the extreme reaction or rebound range of the suspension.

The rear bogie is also provided with axle assemblies which are exactly the same as those described in connection with the front bogie and accordingly, similar parts are identified by the same reference characters.

The operation of the suspension system described above will be readily apparent. Whenever a bump or high spot is encountered by a particular axle assembly, the axle assembly will tend to move upwardly with respect to the sprung assembly and thus the suspension arm will tend to swing in an upward direction about its pivotal connection with the sprung assembly. However, by virtue of the relative angle of the suspension arm, a decrease in sharpness or pitch of a bump or rise in the path of the ground engaging wheels is effected. As the wheel mounts a rise, it will move toward the rear of the vehicle thereby slowing the forward motion of the wheel, thus increasing the time consumed in surmounting the rise. This, in turn, will reduce the velocity of the vertical rise of the unsprung mass (wheels, hubs, axle, etc.). Since kinetic energy stored in the unsprung mass by the impact is a function of the square of velocity, it is apparent that a considerable reduction in magnitude of impacts will result. Recovery time or reaction time, that is, the time required for the suspension to return to normal and get under the load will be reduced in accordance with the reduction in magnitude of the impact in two ways. First of all, as the impact is reduced, so will the reaction be reduced and in proportionate degree, and secondly in the present suspension system the angle of departure from the bump will be increased by virtue of the suspension angle which will, of course, speed up the reaction time.

Under extreme shock loads experienced when passing over very rough terrain, it is possible that the axle assemblies or some of them will move upwardly with respect to the sprung assembly to a point where the tires will actually contact the flat undersurface 75 of the bogie frame. In this connection it will be noted that angle brackets 77 extend laterally outwardly from the bogie frame in continuation of the frame undersurface 75 to provide a surface for contact by the outboard tires on each axle. Thus, in such instances of extreme shock loads, a portion of the load will bypass the suspension and be transmitted directly through the tires and wheels to the sprung assembly.

If desired, additional suspension stops or checks 80' may be provided to serve as a means for determining the extreme bottoming range of the suspension. Checks 80' are engaged by the cooperating members 82 on the suspension arms. The extreme bottoming range thus provided would, of course, be sufficient to allow the tires to contact the flat undersurface 75 of the bogie frame with considerable impact before the extreme bottoming condition is reached.

The drawings and the foregoing specification constitute a description of the improved soft ride trailer in such full, clear, concise and exact terms as to enable any person skilled in the art to practice the invention, the scope of which is indicated by the appended claims.

What I claim as my invention is:

1. A vehicle comprising a sprung assembly, an unsprung assembly having an axle extending transversely of the vehicle, a ground engaging wheel having a tire thereon carried by said axle, a suspension including an arm having an upper portion pivotally connected to said sprung assembly for swinging movement in a vertical plane and inclined from said upper portion downwardly and rearwardly relative to the vehicle to a lower portion spaced from said upper portion and supporting said axle, resilient means interposed between said sprung assembly and said arm resisting upward and rearward swinging of said arm about its pivotal connection with said sprung assembly, said sprung assembly having a portion engageable with said tire on said ground engaging wheel in response to upward and rearward swinging of said arm through an abnormally large angle to bypass said suspension and transmit heavy shock loads directly to said sprung assembly through said tire and wheel, and means for determining the extreme bottoming range of said suspension including a stop carried by said sprung assembly and engageable with said arm upon upward and rearward swinging of said arm through an angle in excess of the aforesaid abnormally large angle.

2. A vehicle comprising a sprung assembly, an unsprung assembly having an axle extending transversely of the vehicle, a ground engaging wheel having a tire thereon carried by said axle, a suspension supporting said sprung assembly on said unsprung assembly and resiliently opposing upward movement of said unsprung assembly relative to said sprung assembly, said sprung assembly having a portion engageable with said tire on said ground engaging wheel in response to abnormal upward movement of said unsprung assembly relative to said sprung assembly to bypass said suspension and transmit heavy shock loads directly to said sprung assembly through said tire and wheel, and means for determining the extreme bottoming range of said suspension including a stop carried by said sprung assembly and engageable with said unsprung assembly upon upward movement of said unsprung assembly in excess of the aforesaid abnormal upward movement thereof.

References Cited in the file of this patent
UNITED STATES PATENTS

| | | |
|---|---|---|
| 1,069,334 | Humphrey | Aug. 5, 1913 |
| 1,562,652 | Nabors | Nov. 24, 1925 |
| 2,384,795 | Canaday | Sept. 18, 1945 |
| 2,442,354 | Gordon | June 1, 1948 |
| 2,493,022 | Pointer | Jan. 3, 1950 |
| 2,507,980 | Knapp | May 16, 1950 |
| 2,597,122 | Mullen | May 20, 1952 |
| 2,635,896 | Tantlinger | Apr. 21, 1953 |
| 2,673,745 | Nallinger | Mar. 30, 1954 |
| 2,773,699 | Grumman | Dec. 11, 1956 |